(12) United States Patent
Neumann et al.

(10) Patent No.: US 6,292,381 B1
(45) Date of Patent: Sep. 18, 2001

(54) AC TO DC POWER SUPPLY WITH SUPPLEMENTAL ENERGY STORAGE

(75) Inventors: Peter W. Neumann; Louis J. Vassos, both of Chicago, IL (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/465,861

(22) Filed: Dec. 16, 1999

(51) Int. Cl.[7] ................................................. H02M 7/06
(52) U.S. Cl. ............................................... 363/126; 307/48
(58) Field of Search ....................... 307/44, 48; 363/125, 363/126

(56) References Cited

U.S. PATENT DOCUMENTS

| 2,675,490 | | 4/1954 | Portail | 307/48 |
|---|---|---|---|---|
| 3,257,603 | | 6/1966 | Laube | 363/125 |
| 3,267,288 | * | 8/1966 | Maiden et al. | 363/126 |
| 3,599,073 | | 8/1971 | Wilson et al. | 320/39 |
| 3,950,690 | * | 4/1976 | Campbell | 363/126 |
| 4,700,122 | | 10/1987 | Cimino et al. | 320/61 |
| 4,959,766 | * | 9/1990 | Jain | 363/126 |
| 5,045,086 | * | 9/1991 | Juergens | 29/623.1 |
| 5,150,032 | | 9/1992 | Ho | 320/14 |
| 5,243,510 | * | 9/1993 | Cheney | 363/126 |
| 5,255,175 | * | 10/1993 | Uchino | 363/126 |
| 5,422,804 | * | 6/1995 | Clark | 363/126 |
| 5,568,038 | | 10/1996 | Tatsumi | 320/14 |
| 5,581,449 | * | 12/1996 | Sridharan | 363/126 |
| 5,675,486 | * | 10/1997 | Ishii | 363/126 |
| 5,933,342 | * | 8/1999 | Callahan | 363/126 |
| 6,040,640 | * | 3/2000 | Gehre et al. | 307/48 |

* cited by examiner

Primary Examiner—Jeffrey Sterrett
(74) Attorney, Agent, or Firm—Greer, Burns & Crain, Ltd.

(57) ABSTRACT

An AC to DC power supply is disclosed which converts an AC input voltage to a DC output voltage and supplies the DC output voltage to power devices. The power supply includes a transformer for reducing a voltage level of the AC input voltage and an energy storage device in the form of a Bolder battery that has low internal resistance and is capable of generating high power generally instantaneously. The energy storage device enables the power supply to meet high electrical loads that exceed the output of the transformer.

2 Claims, 2 Drawing Sheets

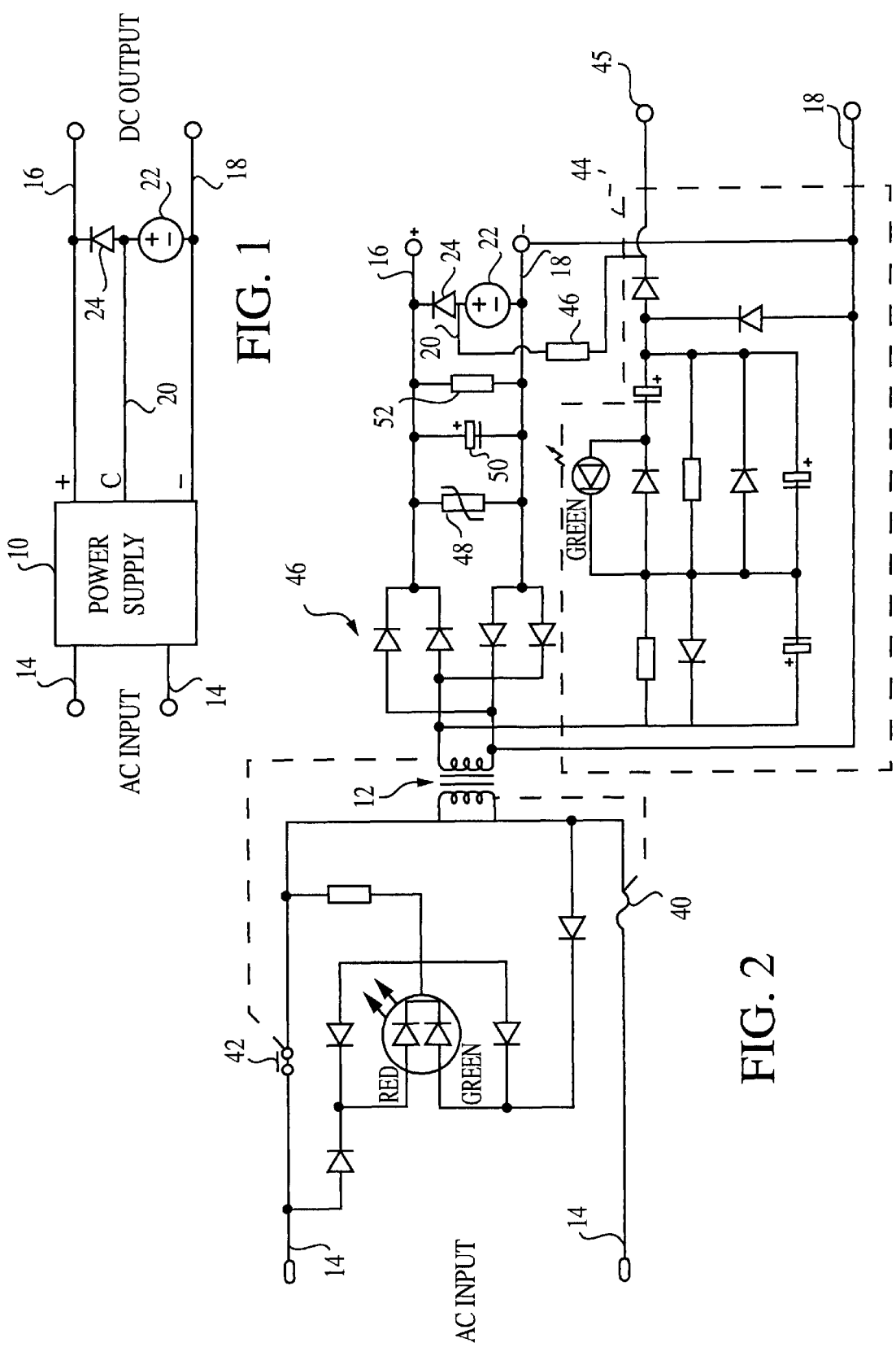

AC TO DC POWER SUPPLY WITH SUPPLEMENTAL ENERGY STORAGE

The present invention generally relates to power supplies for battery operated devices, and more particularly to an AC power supply system which is adapted to supply DC power to battery operated devices.

It is common for power devices or tools such as drills, circular saws, sanders, etc., to be battery powered. If such devices are adapted to be battery driven, they necessarily have DC motors, and if they are connected to an AC power source, they must have an AC to DC converter to operate the devices. Many tools are designed to receive cordless power packs which lock directly onto the tools, and is desirable to have a corded AC to DC converter be sized so that it will also fit in the same compartment as the power pack.

A typical converter includes a power transformer device for converting AC power to DC power and supplying the converted DC power to the tool. The transformer contained in the converter tends to heat-up, particularly if there is a large load developed from the use of the tool. Increasing the size of the transformer can prevent or at least alleviate the over-heating problem, but there is a cost associated with the larger size and there are practical size constraints imposed by the compartment of the tool in which the converter is intended to fit. Also, a large transformer may be undesirable because the size and weight of the power supply may make it difficult to use the tool.

Accordingly, it is a primary objective of the present invention to provide an improved AC to DC power supply for powering DC devices and tools which is adapted to provide adequate DC power, but which is capable of supplying high power to meet an electrical load drawn by a tool for short time periods.

Another object of the present invention to provide such an improved AC to DC power supply which has a transformer with a predetermined power rating, the power supply being capable of supplementing the power supplied from the transformer to meet an electrical load drawn by a tool that cannot be supplied by the transformer alone.

A more detailed object of the present invention is to provide such an improved power supply that has a transformer with a predetermined power rating and a battery that can provide high current almost instantaneously to supplement the transformer output to meet short duration electrical loads that occur during operation of a tool or other device.

Another object of the present invention is to provide such an improved power supply that is adapted to simultaneously provide power to the tool and charge the battery when the battery is not supplying power to the tool.

Other objects and advantages will become apparent upon reading the following detailed description, in conjunction with the attached drawings, in which:

FIG. 1 is a block diagram of the present invention;

FIG. 2 is a detailed schematic diagram of the circuitry of FIG. 1; and,

DETAILED DESCRIPTION

Figure 3:
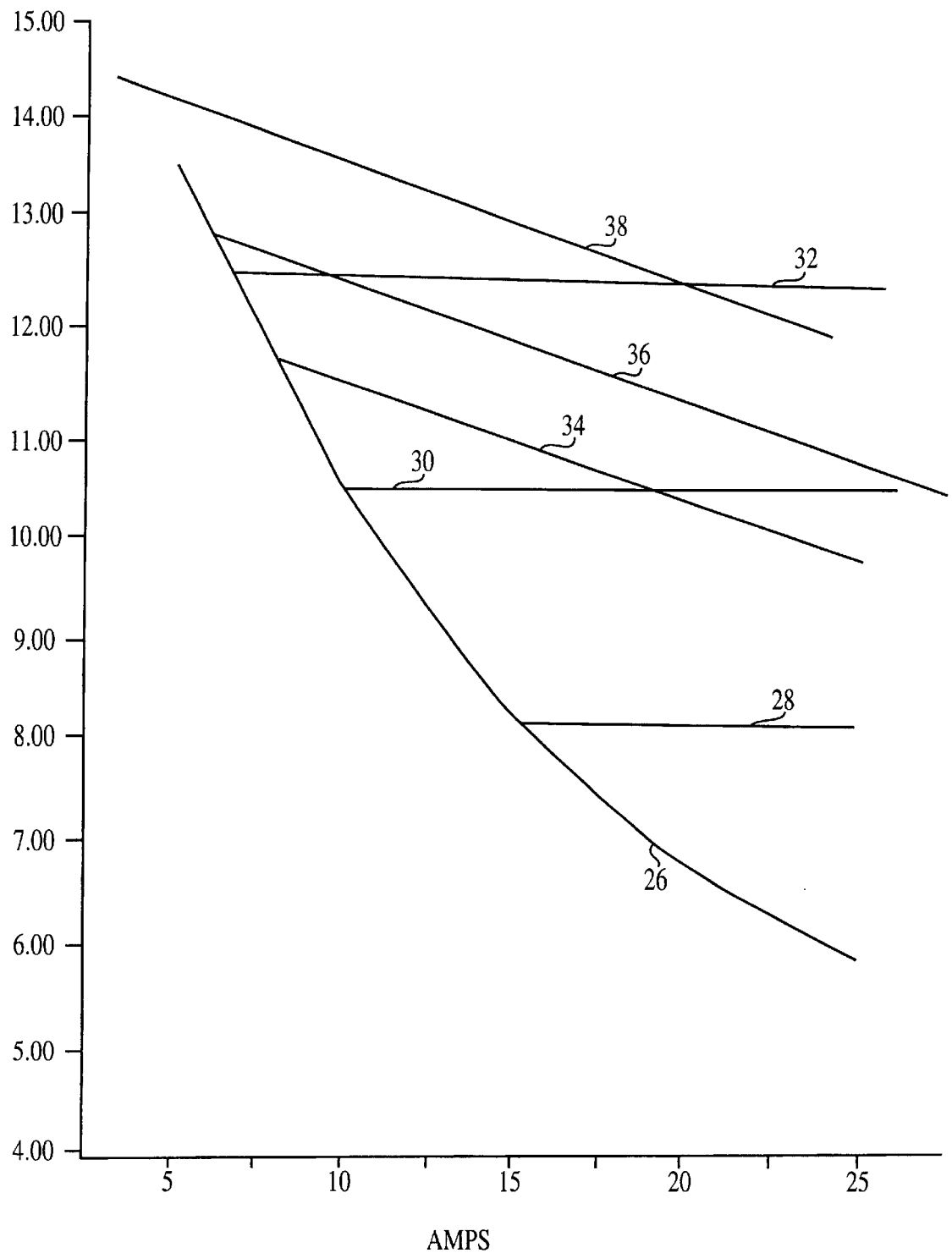
FIG. 3 is a chart of the current vs. the voltage of the output of the present invention under various operating loads.

Broadly stated, the present invention is directed to a power supply for converting an AC input voltage to a DC output voltage and supplying the DC output voltage to power devices, such as power hand tools, e.g., circular saws, jigsaws, sanders, flashlights, lawn and garden tools, inflators, etc. The power supply includes a transformer for reducing the voltage level of the AC input voltage and a rectifier electrically connected to the transformer for rectifying the AC input voltage reduced by the transformer into the DC output voltage which is supplied to the power devices. The invention also includes an energy storage means that is electrically connected to the DC output for supplying current at a predetermined voltage to the DC output in response to the power device drawing a load that exceeds the power capacity of the transformer.

Turning now to FIG. 1, the circuitry of the present power supply is indicated generally at 10 and includes a step-down transformer 12 (not shown), which transforms the input voltage of generally 120 VAC applied to input lines 14 into that which is suitable for supplying DC power on positive and negative lines 16 and 18 respectively, to tools and other motorized appliances as previously identified.

A power supply 10 also has an output line 20 which is connected to the positive terminal of an energy source 22 and to the anode of a diode 24, the cathode of which is connected to line 16. The energy source has its negative terminal connected to line 18. The diode 24 precludes current flow from line 16 into the energy source 22 as is desired. However, line 20 is connected to the positive terminal of the energy source for the purpose of recharging it when it is depleted.

In accordance with an important aspect of the present invention, the power supply with its transformer 12 (not shown) has a predetermined power rating that is designed to preferably supply sufficient power to drive the tools and motorized appliances it is intended to power under generally standard operating or load conditions. The constraints on the design of the power supply are those of cost and size, it being desired to provide sufficient power to drive a series of tools and other motorized appliances under normal conditions, but be small enough that it may fit into the compartment of the appliance that would also be sized to accept a cordless DC power pack, for example. One of the important factors in determining the power output of the power supply is the size of the transformer that is typically used to reduce the input AC voltage (typically 120 VAC) to a lower voltage that is then rectified into a DC voltage that can be used to drive the DC power tools and motorized appliances. The transformer is a key element that determines the power rating of the power supply as well as its size and it is also the transformer that contributes significantly to the cost of the power supply.

In accordance with another important aspect of the present invention, the energy source 22 is preferably a battery system that can be a Nickel Cadmium battery, a Nickel MH battery or a BOLDER Lead-acid battery. The BOLDER battery is preferred because it has the lowest internal resistance and is capable of generating the highest amount of power almost instantaneously. It is preferred that the BOLDER Lead-acid battery comprise a BOLDER-pack containing four cells of 8.4 volt output, although 10 and 12 volt outputs are available and are certainly within the scope of the present invention. The power supply 10 also includes a full wave diode bridge (not shown) which converts the AC voltage to a DC voltage that is provided on output lines 16 and 18. With the transformer being connected to the full wave diode bridge, the output characteristic is shown in FIG. 3 by line 26. As shown, the voltage declines as the current or load increases as may happen when a tool such as a saw is used to cut wooden boards, for example. The greater the resistance of the wood which results in the saw slowing down, also results in increased current being drawn which will cause the output voltage to decrease in accordance with the line 26.

However, when the output voltage drops to a certain level which is determined by the output voltage of the energy source 22, which in the case of the four cells of the BOLDER pack having an output of 8.4 volts shown in line 28, the BOLDER pack starts contributing current output once the current output reaches about 15 amps. This enables the voltage to remain approximately constant while the increased load is supplied by the BOLDER battery 22. The nature of this operation allows the possibility of using the smallest possible transformer. By allowing the BOLDER battery 22 to contribute current under heavy load conditions experienced by tools or the like exceeding 20 amps, the amount of time before a thermal-protector opens can be extended which is desirable. When the load is reduced to the power levels that can be supplied by the transformer itself, the BOLDER battery 22 can be recharged by line 20 so that it is available for subsequent high load use. Lines 30 and 32 show similar operation with BOLDER cells having approximately 10 and 12 volt outputs and lines 34, 36 and 38 show the output responses of 12V, 13.2V and 14.4V Nickel Cadmium batteries, respectively, which are not as capable of providing increased load that a constant voltage, but which improve the output characteristic relative to the line 26.

In accordance with an important aspect of the present invention, a detailed schematic diagram of the circuitry of FIG. 1 is shown in FIG. 2 which illustrates the lines 14 being connected to the input winding of a transformer 12, with a fuse 40 being linked to the primary winding which is operable to open the circuit when the temperature of the input winding exceeds a predetermined limit. A preset thermostat 42 is also operably connected to the secondary winding of the transformer 12 and is adapted to open when its temperature setting is exceeded. The circuitry on the primary side of the transformer 12 has red and green LED's to provide an indication of the operation of the power supply.

The circuit of FIG. 2 also has a battery charging circuit 44 which has a resistor 46 connected to line 20 that is connected to the positive terminal of the BOLDER energy source 22 and is adapted to recharge the same. The circuit 44 also has a line 45 which together with line 18 provides an output for charging a NICAD battery pack that may be provided to power the power tool or other motorized appliance. The secondary winding of the transformer 12 is connected to a full wave diode bridge rectifier, indicated generally at 46, which provides a DC voltage on line 16 and 18 for driving the tool or other appliance. The output also includes a metal oxide varistor 48, a filter capacitor 50 and a bleed resistor 52. The varister 48 provides transient protection, the filter capacitor 50 holds the voltage up when no current is flowing and the bleed resistor 52 dissipates energy from the filter capacitor.

From the foregoing description, it should be understood that an improved power supply system for power tools and any other motorized appliances has been shown and described which has many desirable attributes and advantages.

The operation of the four cell 8.4 volt BOLDER pack being used in the circuit of FIG. 1 for providing supplemental energy at a 8 volt level and at a 10 volt level as well as operation of a circular saw without a BOLDER battery pack being used as shown below in Table 1.

TABLE 1

| Main Power Source | Col. 1 | Col. 2 | Col. 3 |
|---|---|---|---|
| Supplemental Power Source | None | With 8V BOLDER Assist | With 10V BOLDER Assist |
| Tool Used | 14.4V Saw | 14.4V Saw | 14.4V Saw |
| Cutting 2" × 4" Fir number of cuts before the preset thermostat trips | 8 | 18 | 29 |
| Energy left in BOLDER Pack | — | 48% | 33% |

As shown in column 1 of the table, with no BOLDER battery pack assist, a 14.4 volt circular saw was used to cut two-by-four boards and only eight cuts were made before the thermal-overload 42 tripped. However, in column 2 with an 8 volt BOLDER assist being used in accordance with the present invention, eighteen cuts were made before the thermal-overload 42 opened. Also, there was 48% of the energy left in the BOLDER pack when this occurred. Finally, in column 3 a 10 volt BOLDER battery pack was used with the same circular saw and 29 cuts were made before the thermal-overload switch 42 tripped out and 33% of the energy was left in the BOLDER pack when this occurred.

The present invention enables a power supply of the type which utilizes a step down transformer to be sized smaller and less expensively than would otherwise be required to meet high load conditions, because the power supply includes a supplemental source in preferably in the form of the low internal resistance and high instantaneous power or output. This enables the output of the transformer which is rectified by the full wave diode bridge to be supplemented by the BOLDER battery pack which enables a very high current load to be supplied for a short period of time which significantly extends the time that would otherwise result in a thermal-protector opening the circuit.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A power supply apparatus for converting an AC input voltage to a DC output voltage that is supplied to a DC output having positive and negative connection points for powering a motorized appliance or the like, said apparatus comprising:

transforming means adapted to be electrically connected to the AC input voltage for reducing the voltage level of the input voltage, said transforming means having a predetermined power capacity;

means electrically connected to said transforming means for full-wave AC to DC rectifying the AC input voltage reduced by said transforming means into the DC output voltage which is supplied to the motored appliance or the like;

energy storage means comprising at least one lead acid battery having a positive terminal and a negative terminal, said battery having a low internal resistance and being capable of generating high power generally instantaneously, said energy storage means being electrically connected to the DC output for supplying current at a predetermined voltage to the DC output in response to the motorized appliance drawing a load that exceeds the power capacity of said transforming means;

a battery charger electrically and operatively connected to said transforming means for charging said battery; and, a diode having its anode connected to the positive terminal of said battery and its cathode connected to said positive connection point such that current cannot flow to said battery from said rectifying means, said battery charger being connected to said anode and said positive terminal of said battery.

2. The apparatus as defined in claim 1 wherein said transforming means is a step-down transformer including a primary winding and a secondary winding.

* * * * *

UNITED STATES PATENT AND TRADEMARK OFFICE
CERTIFICATE OF CORRECTION

PATENT NO. : 6,292,381 B1  Page 1 of 1
DATED : September 18, 2001
INVENTOR(S) : Neumann et al.

It is certified that error appears in the above-identified patent and that said Letters Patent is hereby corrected as shown below:

Column 4,
Line 50, after "a", insert -- DC --; after "like" and before "," insert -- of the type which is designed to be powered by a removable primary battery source
Line 56, insert the following paragraph: -- a thermal cutoff operably associated with said transforming means for open circuiting said transforming means in response to the temperature of said transforming means exceeding a predetermined limit during operation; --.
Line 61, before "energy" insert -- supplemental --.
Line 65, after "said" insert -- supplemental --.

Column 5,
Line 3, after "means" insert -- , said supplemental energy storage means supplying current to the DC output thereby reducing the load on said transforming means and extending the duration of operation of the motorized appliance before said thermal cutoff open circuits said transformer means --.
Line 5, after "battery" insert -- and said removable primary battery source when connected --.

Signed and Sealed this

Twenty-fifth Day of June, 2002

Attest:

JAMES E. ROGAN
Attesting Officer   Director of the United States Patent and Trademark Office